W. MEYER.
OPTICAL APPARATUS.
APPLICATION FILED JAN. 31, 1919.
1,353,259.
Patented Sept. 21, 1920.
2 SHEETS—SHEET 1.
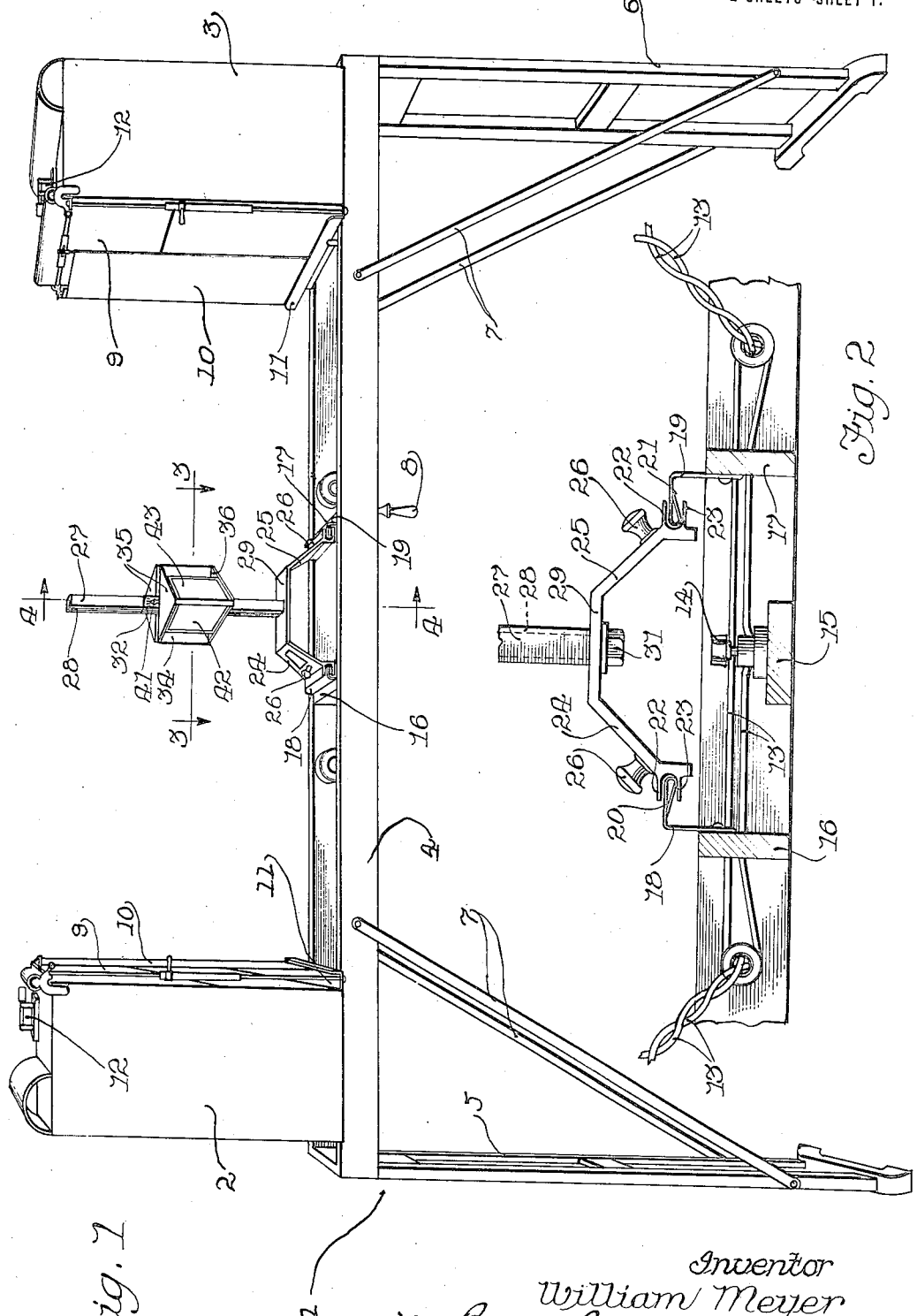
Inventor
William Meyer
By Brown Bottner & Dinner
Attorneys.

W. MEYER.
OPTICAL APPARATUS.
APPLICATION FILED JAN. 31, 1919.
1,353,259.
Patented Sept. 21, 1920.
2 SHEETS—SHEET 2.
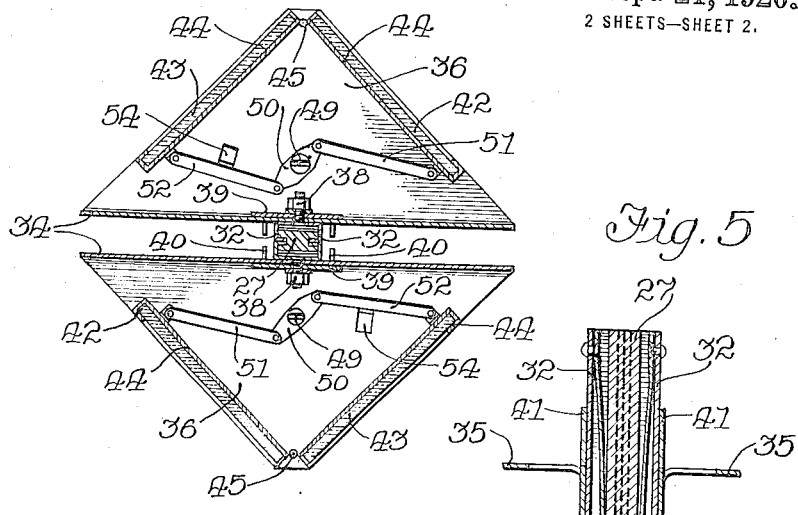
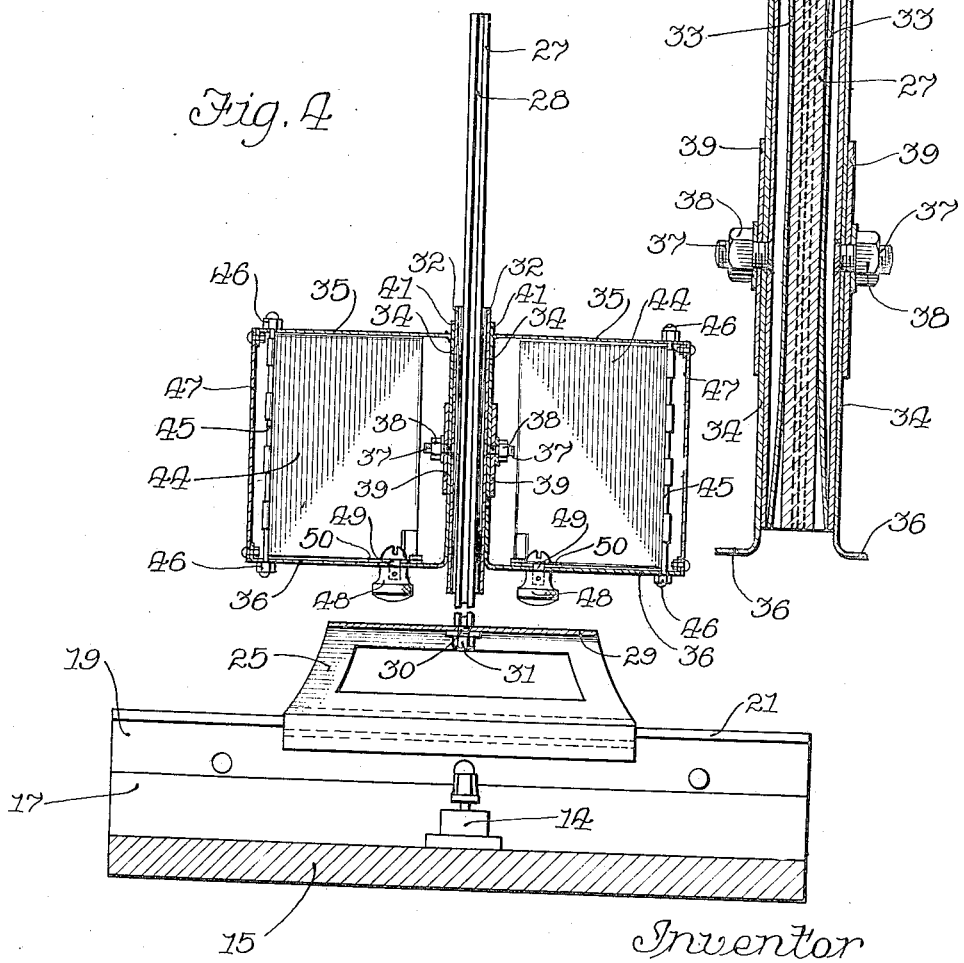
Inventor
William Meyer
By Brown Betters & Dienner
Attorneys

UNITED STATES PATENT OFFICE.

WILLIAM MEYER, OF CHICAGO, ILLINOIS.

OPTICAL APPARATUS.

1,353,259.     Specification of Letters Patent.     Patented Sept. 21, 1920.

Application filed January 31, 1919. Serial No. 274,166.

*To whom it may concern:*

Be it known that I, WILLIAM MEYER, a citizen of the United States, residing at Chicago, in the county of Cook and State of Illinois, have invented a certain new and useful Improvement in Optical Apparatus, of which the following is a full, clear, concise, and exact description, reference being had to the accompanying drawings, forming a part of this specification.

My invention relates to optical apparatus and more particularly to stereoscopes of the Wheatstone or reflecting type.

Stereoscopes of this type are an indispensible auxiliary in elementary as well as professional education, being particularly adapted for portraying X-ray images although they are equally as useful in other connections, such as stereoscopic surveying and the like, as will be well understood by those skilled in the art. Fundamentally the Wheatstone or reflecting stereoscope comprises a pair of illuminating cabinets or transparency holders for holding and illuminating the two negatives, a pair of viewing mirrors being mounted between the two cabinets at 90° to each other and at 45° to the two negatives to be viewed. As it is invariably necessary that the illuminating cabinets or transparency holders shall be equi-distant from the mirrors, these cabinets are preferably slidably mounted upon a suitable table, means being provided for causing the cabinets to approach or recede from each other in unison. The viewing mirrors are mounted in a suitable frame disposed between the illuminating cabinets, this frame being movable at right angles to the movement of the cabinets.

A very difficult problem in the proper portrayal of stereoscopic pictures has been that of placing the images in exact corresponding positions on the two pictures. For example, in the portrayal of an X-ray image, two radiographs must be taken from two distinct viewpoints separated the normal distance that we have between the pupils of the eyes. It is necessary to exercise extreme caution when placing the unexposed negatives in the plate changer or carrier for, if not placed in exact corresponding positions, the image on one negative might not be in the same plane or at the same height when viewed in the mirrors at which the image on the other negative is at. This will distort or even destroy the stereoscopic view sought, as the images must be in exact corresponding positions if the binocular image is to be immediately seen single, of it proper magnitude and without fatigue to the eyes. In order to make radiographs from two distinct viewpoints, it is also necessary to move the X-ray tube just two and one-half inches (the average pupilary distance) in a lateral plane between the exposures, at the same time preserving the same relative position in regard to all planes. This is exceeding difficult as I have found that slight variations in position or alinement of the two images on their respective plates often occurs. Heretofore in the art such disalinement has prevented the proper portrayal of the binocular image as no means has been provided for remedying such conditions; the negatives and mirrors being in fixed angular positions.

It is further desirable in order that negatives of different sizes may be viewed to advantage or even parts of images or rather high negatives, that the mirrors be readily adjustable to different vertical heights.

Heretofore in the art only one person at a time could view the stereoscopic pictures as portrayed by stereoscopes of the reflecting type. In modern surgical procedure particularly it is often very desirable and important that two; the röntgenologist and the surgeon should view the image at the same time in order to be better able to discuss the pathology thereof.

I accomplish one of the aims by my invention, namely, that both the röntgenologist and the surgeon may view the stereoscopic image at the same time by providing two mirror sets instead of one. Obviously if the mirrors were fixed as in the present types, these two opposite sets would not both stereoscope nor accommodate eyes of different observers at the same time. I have overcome this by making in each set of mirrors the angle between the two mirrors of the set adjustable. Thus either set of mirrors may be adjusted independently of the other set to that angle at which the binocular image will be immediately seen single, of the proper magnitude and without fatigue to the eyes. This adjustment is also adapted for readily correcting any horizontal disalinement of the two images.

I have provided for readily overcoming any faulty vertical or angular alinement of the two images by supporting each mirror set pivotally so that when one of the mirrors of the set is elevated, the other mirror is lowered. In this way the two images may be quickly brought to a common horizontal line where stereoscopic effect is obtained.

In order to focus upon any particular part of the stereoscopic image at a convenient angle without subjecting the eyes to an upward or downward strain which interferes with clear observation, as well as accommodating persons of different stature, both mirror sets are preferably mounted slidably on one common upright post whereby either set may be moved up or down at the option of its observer or operator.

In order that those skilled in the art may be fully acquainted with the nature and scope of my invention, I shall describe a specific embodiment of the invention in connection with the accompanying drawings which form a part of the present specification.

Figure 1 is a perspective view of a typical reflecting stereoscope showing my improved viewing device in connection therewith;

Fig. 2 is a longitudinal sectional view illustrating the manner in which the carriage member of my improved viewing device is mounted for movement at right angles to the movement of the illuminating cabinets or transparency holders;

Fig. 3 is a horizontal sectional view of my improved viewing device taken substantially on the line 3—3 of Fig. 1;

Fig. 4 is a vertical transverse sectional view taken substantially on the line 4—4 of Fig. 1; and Fig. 5 is an enlarged fragmentary vertical sectional view, showing the manner of mounting the two opposite mirror sets whereby independent vertical movement is afforded each set.

The particular stereoscope shown in the drawings comprises a table 1 which supports the illuminating cabinets or transparency holders 2 and 3 with my improved viewing device arranged therebetween, as will be hereinafter described.

The table 1 comprises a rectangular frame 4 supported at its opposite ends by suitable supporting legs 5 and 6. The legs 5 and 6 may be hinged to the rectangular frame 4, if so desired, in order that these legs may be folded into parallel engagement with the frame when not in use or when packed for shipment. The supporting legs 5 and 6 are braced when in the position shown in Fig. 1 by means of diagonal braces 7. The lower free ends of the diagonal braces 7 are secured to the legs 5 and 6 respectively, the opposite ends of these braces being carried by the longitudinal side pieces of the rectangular frame 4.

The illuminating cabinets or transparency holders 2 and 3 are mounted for movement longitudinally along the upper edge of the rectangular frame 4. It is invariably necessary that the upright transparency holders 2 and 3 shall be at the same distance from their respective viewing mirrors. To facilitate this double adjustment, each of the transparency holders or illuminating cabinets may be mounted upon suitable guides or tracks (not shown) carried by the rectangular frame 4. The cabinets are preferably interconnected by suitable levers in order that by means of a handle 8, they may be moved in unison toward or away from the center of the frame 4, where my improved viewing device is mounted upon a carriage member, which is movable at right angles to the movement of the cabinets 2 and 3, as will be hereinafter described. Each of the illuminating cabinets 2 and 3 is provided with a pair of roller shades 9 and 10. The axes of the rollers for the shades 9 are arranged at right angles to the axes of the rollers for the shades 10 whereby perfect adjustment is allowed for any size transparency.

In surgical procedure, the stereoscopic negatives are inserted in channels 11 provided longitudinally along the front edges of the illuminating cabinets 2 and 3 respectively. The roller shades 9 and 10 are then drawn so that all rays of light other than those transmitted through the transparencies will be screened from the viewing device and consequently from the eyes of the observer. Although a single electric lamp would suffice each of the cabinets 2 and 3 are preferably provided with several lamps, suitable switches 12 being provided for each of the lamps whereby one lamp or any combination of lamps may be lighted depending on the size of the negatives. Frequently large negatives may require more or less illumination through one particular part, this being afforded by the use of several lamps with independent switches for each. The electric lamps in the illuminating cabinets 2 and 3 are supplied through suitable electrical conductors 13, and are controlled jointly by a common switch 14 mounted upon a cross brace 15 of the table 1.

As shown in Fig. 2, the cross brace 15 extends between the longitudinal side pieces of the rectangular frame 4 about equi-distant from the opposite ends thereof. Transversely extending braces 16 and 17 employed in connection with my improved viewing device are spaced at substantially equal distances from either side of the cross brace 15 and extend transversely between the longitudinal side pieces of the rectangular frame 4 of the table 1.

The carriage member of my improved viewing device is carried and guided transversely across the frame 4 by sheet metal guiding members 18 and 19 carried by the transversely extending braces 16 and 17, respectively. The guiding members 18 and 19 are of substantially the same length as the cross braces 16 and 17 and are bent within their width to provide suitable horizontally extending guiding portions and suitable downwardly or vertically extending edges whereby the guiding members 18 and 19 are secured along the upper inner edges of the cross braces 16 and 17, respectively, by means of suitable screws or the like. The inner edges of the horizontally extending guiding portions 20 and 21 of the guiding members 18 and 19 are preferably bent back as shown in Fig. 2 to present a reinforced guiding edge to the carriage member, each of which guiding edges coöperate with a pair of outwardly extending parallel spaced guide flanges 22 and 23 provided along the lower free edges of each of the diagonally extending portions 24 and 25, respectively, of the carriage member.

The diagonal portions 24 and 25 of the carriage member extend diagonally downwardly from the opposite edges of the flat horizontal portion 29 thereof. Each of these diagonally extending portions 24 and 25 is provided with a finger piece 26 whereby the carriage member may be shifted along the transverse guiding members 18 and 19 into any desired position, depending of course upon the size of the negatives and the position of the same in the illuminating cabinets.

A vertical slide post 27 provided with longitudinal grooves 28 in its opposite edges as shown in Figs. 3 and 4 is mounted in an upright position on the flat horizontal portion 29 of the carriage member. The lower end of the vertical slide post 27 is provided with a threaded shank 30 which extends through the flat horizontal portion 29 of the carriage member and engages in a suitable nut 31 which nut is threaded into engagement with the under surface of the flat horizontal portion 29 of the carriage member, thereby securely mounting the slide post 27 in an upright position thereupon.

Channel members 32, each of which carries a complete mirror set, as will be described, are mounted for vertical movement upon the opposite faces respectively of the upright slide post 27. These channel members 32 embrace the opposite faces and opposite edges respectively of the slide post 27 and are provided with inwardly extending edges which engage (as shown in Fig. 3) in the longitudinal grooves 28 provided in the opposite edges of the slide post 27.

A leaf spring 33 is riveted or otherwise suitably secured within each of the mirror bearing channel members 32 as shown in Fig. 5. These leaf springs are curved inwardly within their length into engagement with the opposite faces respectively of the slide post 27. This frictional engagement serves to effectively retain either of the mirror bearing channel members 32 in any desired vertical position on the slidepost 27. Thus independent vertical adjustment of either of the mirrors is afforded at the option of its particular observer, in order that the observer may focus upon any particular part of the image at a convenient angle without subjecting the eyes to an upward or downward strain which interferes with clear observation.

A mirror holder is pivotally mounted upon the outer faces respectively of each of the mirror bearing channel members 32. These mirror holders which are identical, preferably comprise a single piece of sheet metal formed to provide a rectangular back wall 34 having substantially triangular top and bottom walls 35 and 36, respectively, extending at right angles therefrom. One of these holders is pivotally mounted upon each of the channel members 32 by means of a suitable bolt 37, the threaded shank of which extends through the front wall of the channel member 32, through the rectangular back wall 34 of the mirror holder and engages in a suitable nut 38 whereby the holder is securely mounted upon the channel member 32. A relatively large washer 39 is provided between the inner face of the rectangular wall 34 and the nut 38 in order that the frictional engagement therebetween will be sufficient to effectively retain the mirror holder at any desired angular position, whereby any vertical disalinement of the two images may be readily overcome.

As shown in Fig. 3, lugs 40 struck up from the rectangular back wall 34 of the mirror holder extend inwardly adjacent the opposite edges of the channel member 32. These lugs form suitable stops for limiting the angular movement of the mirror holder about the shank of the bolt 37. The particular inclination of the mirror holder is indicated by a graduated scale provided on the outer front face of the channel member 32 adjacent the upper edge thereof and a pointer 41 struck up from the triangular top wall 35 of the mirror holder.

Each of the mirror holders is provided with a set or pair of viewing mirrows 42 and 43, each of which viewing mirrors is mounted in a suitable frame 44. These mirrors are normally arranged at an angle of substantially 90° with respect to each other and at substantially 45° to the two negatives to be viewed. The adjacent edges of the mirror frames 44 are hingedly mounted upon and revolve about a common vertical post 45. The opposite threaded ends of this vertical post extend through the top and bottom walls 35 and 36, respectively, of the mirror holder and engage in suitable nuts 46. The outer edges of the top and bottom walls 35 and 36 are bent downwardly, as shown in Fig. 4, a facing strip 47 secured at its opposite ends to these downwardly extending edges serves to give the device a finished appearance.

The mirrors 42 and 43 are swung into any desired angular position about the vertical post 45 by means of a finger piece 48 mounted upon the lower end of a short vertical post 49 which vertical post extends upwardly through the triangular bottom wall 36 of the mirror holder and carries a lever 50 on its upper free end as shown in Fig. 3. Connecting links or arms 51 and 52 are pivotally connected to the opposite free ends of the lever 50. The free ends of the links 51 and 52 are pivotally connected to the mirror frames 44 adjacent the inner free edges thereof. Thus, upon revolving the short post 49 by means of the finger piece 48, the mirrors 42 and 43 will be revolved about the vertical post 45 through the lever 50 and connecting links 51 and 52, respectively. A stop 54 may be provided for coöperating with either of the links 51 or 52 to limit the spreading of the mirrors, the back wall of the mirror holder limiting the angular movement of the mirrors 42 and 43 inwardly about the post 45.

Briefly, the operation of my improved device is as follows:

The two similar transparencies are inserted in the channel 11 along the front edges of the illuminating cabinets 2 and 3, respectively. The shades 9 and 10 are then drawn in order to block out all light other than that transmitted through the transparencies. The illuminating cabinets or transparencies 2 and 3 are then shifted along the frame 4 to approximately the position at which stereoscopic effect is obtained in one of the mirror sets, whereupon the mirrors of that set may be swung about the vertical post 45 to the position at which the two reflected images coincide exactly in a horizontal plane. Any vertical disalinement of the two images may then be readily corrected by swinging the entire mirror holder about the shank of the bolt 37 to the position at which the two reflected images coincide exactly in a vertical plane.

It will now be apparent that upon so adjusting one mirror set to suit the eyes of its particular observer, the opposite mirror set, in all probability, will not suit the eyes of its observer at that particular adjustment. The opposite mirror set may then be moved up or down on the post 27 independent of the other mirror set in order to focus upon the image at a convenient angle to suit the stature of its observer. The mirrors 42 and 43 of this set may then be swung about the vertical post 45 to the position at which the two reflected images coincide exactly in a horizontal plane, any disalinement in a vertical plane being readily corrected by swinging the entire mirror holder about the shank of the bolt 37, the particular inclination of the mirror holder being indicated by the graduated scale on the channel member 32 and the pointer 41 carried by the mirror holder. Thus the two opposite mirror sets having been adjusted to suit their particular observers, for instance, in surgical procedure, the röntgenoligist and the surgeon, whereupon they may view the stereoscopic image at the same time in order to be better able to discuss the pathology thereof.

While I have described my invention in connection with the details of a particular embodiment, I do not intend thereby to limit the invention to such details as I am aware and contemplate that modifications and changes may be made without departing from the invention which is set out in the appended claims.

I claim:

1. In combination, a pair of pictures to be observed, a viewing device arranged therebetween and adapted for portraying the images of said pictures to the observer, said viewing device comprising a pair of viewing mirrors pivotally mounted upon a common vertical axis and means for swinging said viewing mirrors in unison about said common vertical axis to increase or decrease the angle therebetween, whereby faulty alinement of the images is readily overcome.

2. In combination, a pair of picture holding devices, a pair of viewing mirrors, a common horizontal shaft, upon which said mirrors are mounted and adapted to be rotated in unison to overcome faulty vertical alinement of the pair of picture holding devices with respect to the said mirrors, a common vertical axis, and means whereby said viewing mirrors may be swung about said vertical axis to overcome faulty horizontal alinement of the picture holding device with respect to the said mirrors.

3. In combination, a pair of picture holding devices, a viewing device arranged therebetween, said viewing device comprising two sets of viewing mirrors, means whereby either of said sets of viewing mirrors may be adjusted independently of the other set in order that stereoscopic effect may be portrayed to two observers at the same time.

4. In combination, a pair of picture holding devices, a carriage member arranged therebetween, an upright post carried by said carriage member, two sets of viewing mirrors slidably mounted on said upright post and adapted for portraying the images of a pair of pictures, and independent adjusting means in each of said mirror sets for overcoming faulty alinement of the two images.

5. In combination, a pair of picture holding devices, a carriage member arranged therebetween, an upright post carried by said carriage member, two sets of viewing mirrors slidably mounted on said upright post and adapted for portraying the images of a pair of pictures, means for retaining said sets of viewing mirrors in any desired position on said upright post, independent horizontal axes for each of said sets of viewing mirrors about which said sets of viewing mirrors may be swung to overcome faulty vertical alinement of the two images, each of said sets of viewing mirrors comprising a pair of viewing mirrors mounted on a common vertical axis about which axis said mirrors are adapted to be swung to overcome faulty horizontal alinement of the two images.

6. In a stereoscope, a pair of light transmitting members, a source of light behind each of said members, a pair of mirrors between said members, means for symmetrically changing the angle between the mirrors to correct for horizontal alinement of the members, and means for tilting the mirrors simultaneously with respect to a horizontal axis for correcting for vertical alinement of the members.

7. In combination with a pair of light transmitting members capable of being moved in unison toward or away from each other, a source of light arranged behind each of said light transmitting members, a carriage member mounted for movement at right angles to the movement of said light transmitting members, an upright post carried by said carriage member, a pair of viewing mirrors slidably mounted on said upright post, means for retaining said viewing mirrors in any desired vertical position on said upright post, said viewing mirrors being adjustable in order that faulty alinement of said light transmitting members may be overcome.

8. In combination, a pair of picture holding devices, a pair of pictures to be observed, a carriage member arranged therebetween, an upright post carried by said carriage member, a channel member slidably mounted on said upright post, means for retaining said channel member in any desired vertical position on said upright post, a viewing device pivotally mounted on said channel member and adapted for portraying the images of said pictures to the observer, faulty vertical alinement of said images being readily overcome by swinging said viewing device about its pivotal mounting.

9. In combination, means for holding two pictures, a viewing device between them comprising a pair of mirrors said mirrors being set at an angle to each other said mirrors having a common adjustment invariably presenting the mirrors at equal angles to said pictures, and a common adjustment for varying the effective angle of one mirror with respect to its picture in different degree from the other mirror and its picture.

10. In combination, means for holding two pictures, a viewing device between them comprising a pair of plane mirrors set normally at substantially equal angles to the pictures, a standard supporting said mirrors and permitting vertical adjustment of the same in unison, means comprising a vertical pivot for varying the common angle, and means for varying the individual angle of each mirror with respect to its picture, said means comprising a horizontal pivot.

In witness whereof, I hereunto subscribe my name this 28th day of January, A. D. 1919.

WILLIAM MEYER.